(12) United States Patent
Butcher et al.

(10) Patent No.: US 9,928,504 B2
(45) Date of Patent: Mar. 27, 2018

(54) SAVING MERCHANT ARTIFACTS TO A VIRTUAL WALLET

(71) Applicant: GOOGLE INC., Mountain View, CA (US)

(72) Inventors: David Butcher, Belmont, CA (US); Raymond Emmett Colline, II, San Bruno, CA (US); Tia Gao, Rockville, MD (US); Daniel Issen, Oakland, CA (US); Peggy Mangot, San Francisco, CA (US); David Singleton, London (GB)

(73) Assignee: GOOGLE LLC, Mountain View, CA (US)

( * ) Notice: Subject to any disclaimer, the term of this patent is extended or adjusted under 35 U.S.C. 154(b) by 13 days.

(21) Appl. No.: 13/928,354

(22) Filed: Jun. 26, 2013

(65) Prior Publication Data

US 2016/0132868 A1    May 12, 2016

Related U.S. Application Data

(60) Provisional application No. 61/664,740, filed on Jun. 26, 2012.

(51) Int. Cl.
*G06Q 20/36* (2012.01)
*G06Q 20/40* (2012.01)
*G06Q 20/20* (2012.01)
*G06Q 20/32* (2012.01)
(Continued)

(52) U.S. Cl.
CPC ............ *G06Q 20/36* (2013.01); *G06Q 10/02* (2013.01); *G06Q 20/10* (2013.01); *G06Q 20/20* (2013.01); *G06Q 20/202* (2013.01); *G06Q 20/32* (2013.01); *G06Q 20/322* (2013.01); *G06Q 20/40* (2013.01); *G06Q 20/4016* (2013.01)

(58) Field of Classification Search
CPC ........ G06Q 20/20; G06Q 20/40; G06Q 20/32; G06Q 20/202; G06Q 20/322
USPC ......................................................... 705/21
See application file for complete search history.

(56) References Cited

U.S. PATENT DOCUMENTS

| 7,117,504 B2 | 10/2006 | Smith et al. |
| 7,533,144 B2 | 5/2009 | Kassab |
| 7,784,684 B2 | 8/2010 | Labrou et al. |

(Continued)

OTHER PUBLICATIONS

Congressional Documents and Publications, Lanham. Mar. 22, 2012. House Financial Services Subcommittee on Financial Institutions and Consumer Credit Hearing: "The Future of Money: How Mobile Payments Could Change Financial Services."*

(Continued)

*Primary Examiner* — Florian M Zeender
*Assistant Examiner* — Fawaad Haider
(74) *Attorney, Agent, or Firm* — Johnson, Marcou & Isaacs, LLC (57) ABSTRACT

A virtual wallet system provides embedded controls to a merchant for association and display with merchant artifacts on a merchant interface. Merchant artifacts may include begin-of-purchase flow items such as coupons, and end-of-purchase flow item such as tickets. When the embedded control displayed on the merchant interface is selected by a user, a save artifact request is communicated to a virtual wallet server allowing the user to instantly save an instance of the merchant artifact to the user's corresponding virtual wallet account.

6 Claims, 4 Drawing Sheets

(51) Int. Cl.
*G06Q 20/10* (2012.01)
*G06Q 10/02* (2012.01)

(56) References Cited

U.S. PATENT DOCUMENTS

| | | |
|---|---|---|
| 8,606,720 B1 | 12/2013 | Baker et al. |
| 2002/0004783 A1* | 1/2002 | Paltenghe et al. ............... 705/41 |
| 2002/0111918 A1 | 8/2002 | Hoshino et al. |
| 2004/0117247 A1 | 6/2004 | Agrawal et al. |
| 2005/0187883 A1 | 8/2005 | Bishop et al. |
| 2006/0089912 A1 | 4/2006 | Spagna et al. |
| 2006/0206376 A1 | 9/2006 | Gibbs et al. |
| 2007/0162337 A1 | 7/2007 | Hawkins et al. |
| 2008/0140520 A1 | 6/2008 | Hyder et al. |
| 2009/0144161 A1* | 6/2009 | Fisher ............................. 705/16 |
| 2009/0234751 A1 | 9/2009 | Chan et al. |
| 2009/0288012 A1 | 11/2009 | Hertel et al. |
| 2010/0318407 A1 | 12/2010 | Leff et al. |
| 2012/0041881 A1 | 2/2012 | Basu et al. |
| 2012/0233070 A1 | 9/2012 | Calman et al. |
| 2012/0266059 A1* | 10/2012 | Abela .................... G06Q 30/06 715/234 |
| 2012/0271697 A1 | 10/2012 | Gilman et al. |
| 2013/0024371 A1 | 1/2013 | Hariramani et al. |
| 2013/0036048 A1 | 2/2013 | Campos et al. |
| 2013/0041734 A1 | 2/2013 | Dean et al. |
| 2013/0054336 A1 | 2/2013 | Graylin |
| 2013/0211890 A1 | 8/2013 | Heitmueller et al. |
| 2014/0074581 A1 | 3/2014 | Johnson et al. |

OTHER PUBLICATIONS

Martinez-Hernande, "U.S. Office Action issued in copending U.S. Appl. No. 13/895,329, filed May 15, 2013", dated Oct. 21, 2016, 39 pages.

U.S. Appl. No. 13/895,329 to Gileadi et al., filed May 15, 2013.

Martinez-Hernand, "U.S. Office Action issued in copending U.S. Appl. No. 13/895,329, filed May 15, 2013", dated Mar. 23, 2016, 23 pages.

Martinez-Hernand, "U.S. Office Action issued in copending U.S. Appl. No. 13/895,329, filed May 15, 2013", dated Jul. 11, 2017, 41 pages.

Martinez-Hernand, "U.S. Office Action issued in copending U.S. Appl. No. 13/895,329, filed May 15, 2013", dated Jan. 24, 2018, 47 pages.

* cited by examiner

SAVING MERCHANT ARTIFACTS TO A VIRTUAL WALLET

RELATED APPLICATIONS

This application claims priority to U.S. Provisional Patent Application No. 61/664,740 filed Jun. 26, 2012 and entitled "Saving Merchant Artifacts to a Virtual Wallet." The entire contents of the above-identified priority application are hereby fully incorporated herein by reference.

TECHNICAL FIELD

The present disclosure relates to systems and methods for enabling merchants and users to store artifacts to user virtual wallets. The artifacts may include offers, coupons, discounts, tickets, passes, receipts, and other tokens or documents of completed or potential transactions between the merchant and the user. The virtual wallet may be accessed through a mobile computing device associated with the user.

BACKGROUND

Customers and merchants alike rely increasingly upon electronic payment mechanisms. More traditional debit and credit cards are evolving to active payment tokens, such as mobile devices with Near Field Communication ("NFC") modules. Such systems may organize payment mechanisms into virtual wallet systems.

In addition to storing and organizing payment mechanisms within a virtual wallet, there is a need in the art to organize, store, and retrieve various other artifacts, such as movie tickets, coupons, boarding passes, receipts, and so forth. There is a further need to support efficient technology for merchants to offer pushing of such artifacts to a user's virtual wallet from the merchant's existing, or similar, online user interfaces.

SUMMARY

In certain example embodiments described herein, methods and systems can support storing a merchant artifact from a merchant website to a virtual wallet associated with a user. A merchant may be provided with an interface for embedding a control on the merchant website. In response to the user activating the control, a server associated with the virtual wallet may receive a request to store the artifact. The artifact associated with the website may be saved into the virtual wallet associated with the user. Later, redemption or display of the saved artifact from the virtual wallet may be supported. Such support may include offline redemption from a mobile computing device associated with the user.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Embodiments herein provide computer-implemented techniques for saving merchant artifacts to a user's virtual wallet, such as an electronic wallet account. Such artifacts may include movie tickets, coupons, offers, discounts, loyalty programs, boarding passes, receipts, and so forth. The merchant can support the feature to save artifacts within an existing online user interface. According to one or more examples, a merchant may offer a coupon on their web site. The merchant may then also embed a button on the same page of the site allowing the user to click the button if they wish to save the coupon to the user's virtual wallet. Exercising this option by clicking the button can support saving an instance of an offer into the user's virtual wallet for offline redemption using a mobile device, such as a smartphone when that mobile computing device is associated with the user's virtual wallet.

Turning now to the drawings, in which like numerals indicate like (but not necessarily identical) elements throughout the figures, example embodiments are described in detail.

Example System Architectures

Figure 1:
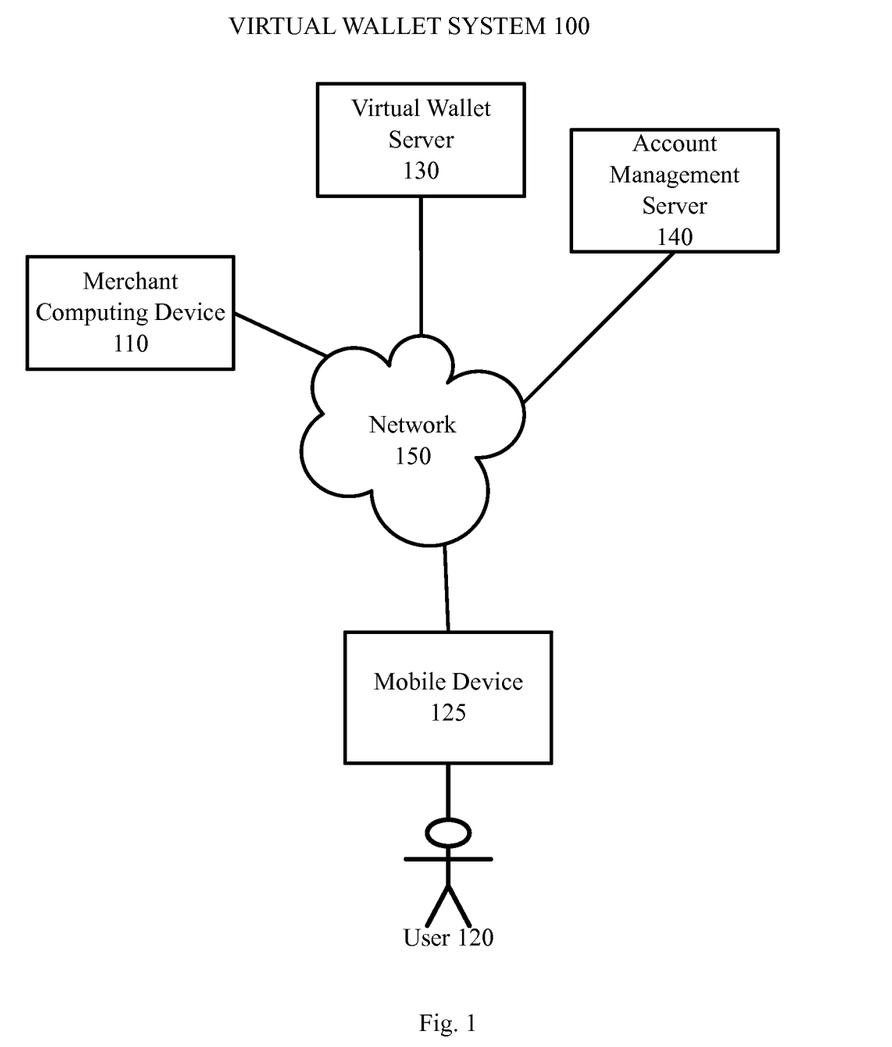
FIG. 1 is a block diagram depicting a virtual wallet system, in accordance with certain example embodiments.

FIG. 1 depicts a virtual wallet system 100, in accordance with certain example embodiments. As depicted in FIG. 1, the system 100 can comprise a merchant computing device 110, a user 120, a mobile computing device 125 associated with the user 120, a virtual wallet server 130, and an account management server 140. Each of the computing devices may be configured to communicate via a network 150 such as the Internet. In some embodiments, a user 120 associated with a mobile computing device 125 must install an application and/or make a feature selection to obtain the benefits of the techniques described herein.

Each network 150 includes a wired or wireless telecommunication means by which network devices (110, 125, 130, and 140) can exchange data. For example, each network 150 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 125, 130 and 140 includes a device having a communication module capable of transmitting and receiving data over the network 150. For example, each network device 110, 125, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices (including devices 110, 125, 130, and 140) are operated by merchant operators (not depicted), by users or consumers 120, and virtual wallet or account management server operators (not depicted) respectively.

The merchant computing device 110 can provide digital artifacts to be stored in a virtual wallet associated with the user 120. Operations associated with the virtual wallet of the user 120 may be provided by or supported by the virtual wallet server 130. These operations may include receiving merchant artifacts from various artifact distribution channels and communicating or displaying merchant artifacts for redemption through various redemption channels. In certain example embodiments, one or more of these redemption channels may be associated with the mobile computing device 125 or other computing system associated with the user 120.

As used herein the term "virtual wallet" encompasses its plain and ordinary meaning, including, but not limited to a computerized system for electronically storing, organizing, and presenting payment mechanisms such as credit/debit cards and banking accounts. The virtual wallet may also be used for electronically storing, organizing, and presenting various artifacts such as offers, coupons, tickets, passes, receipts, and so forth. The virtual wallet and its contents may be stored on the mobile computing device 125, another system associated with the user 120, the virtual wallet server 130, the account management server 140, or may be synchronized across any combination or all of these, depending on implementation.

As used herein the term "merchant artifact" encompasses its plain and ordinary meaning, including, but not limited to end-of-flow artifacts such as receipts or movie tickets as well as beginning-of-flow artifacts such as coupons or offers. The virtual wallet server 130 can accommodate arbitrarily defined artifacts for maximum flexibility to the merchant computing device 110.

A merchant computing device 110 may register with the virtual wallet server 130. The merchant computing device 110 may then obtain, from the virtual wallet server 130, interface elements for presenting to the user 120. Such interface elements may include buttons, menus, or other user interface controls. Activations of the interface elements allows the user 120 to store such artifacts to the user's virtual wallet.

As used herein the term "interface control" encompasses its plain and ordinary meaning, including, but not limited to buttons, menus, sliders, or other user interface objects associated with a distribution channel. A distribution channel may include various mechanisms for presenting artifacts from the merchant computer device 110 to the user 120 such as web sites, video, audio, emails, other online examples, as well as paper mailings, posters, flyers, or other offline examples.

The virtual wallet functions presented herein may be considered middleware between a wide array of possible artifact distribution channels and a wide array of artifact redemption channels. A redemption channel may include MFC, RFID, RF, WiFi, barcode, or various other online examples as well as offline examples such as printed tickets or hand-entered redemption codes.

The virtual wallet server 130 and the account management server 140 may be affiliated or operated by the same or related entities. Accordingly, the virtual wallet server 130 and the account management server 140 may operate on the same server, server hardware, or collection of servers. They may also operate on separate platforms. The account management server 140 can provide account management for, and access to, the virtual wallet server 130. These services may relate to the merchant (not depicted), the user 120, or various other participants. In certain example embodiments, the user's virtual wallet is stored in an index on the virtual wallet server 130.

According to some embodiments the mobile computing device 125 may include a NFC controller and an NFC antenna enabling the mobile computing device 125 to wirelessly communicate with other NFC-enabled devices (not shown). For example, the mobile computing device 125 can communicate with NFC-enabled point of sale ("POS") devices, ticketing devices, security devices, and other systems associated with the merchant computing device 110. It should be appreciated that the mobile computing device 125 may support artifact redemption in various formats such as visually displaying a textual code, visually displaying a bar code, rendering audio, video, images, infrared, radio frequency, RFID, or any other communications for interfacing with a system or human agent of the merchant computing device 110.

It will be appreciated that the network connections shown are example and other means of establishing a communications link between the computers and devices can be used. Moreover, those having ordinary skill in the art having the benefit of the present disclosure will appreciate that the merchant computing device 110, virtual wallet server 130, account management server 140 and mobile computing device 125 illustrated in FIG. 1 can have any of several other suitable computer system configurations. For example a mobile computing device 125 embodied as a mobile phone or handheld computer may not include all the components described above.

Example Processes

Figure 2:
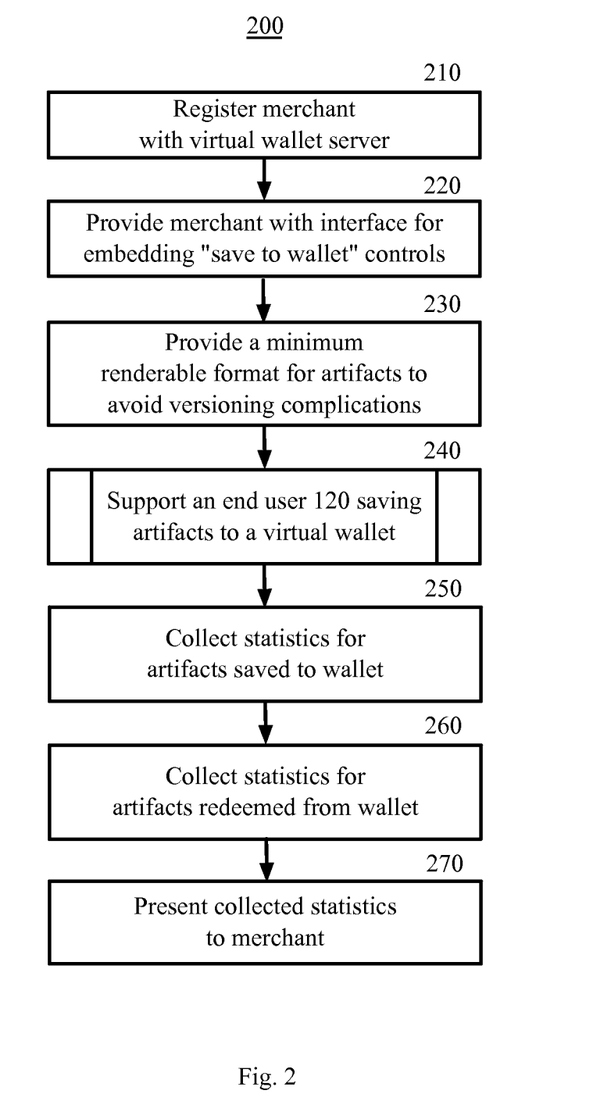
FIG. 2 is a block flow diagram depicting a method for supporting merchant virtual wallet activities, in accordance with certain example embodiments.
Figure 3:
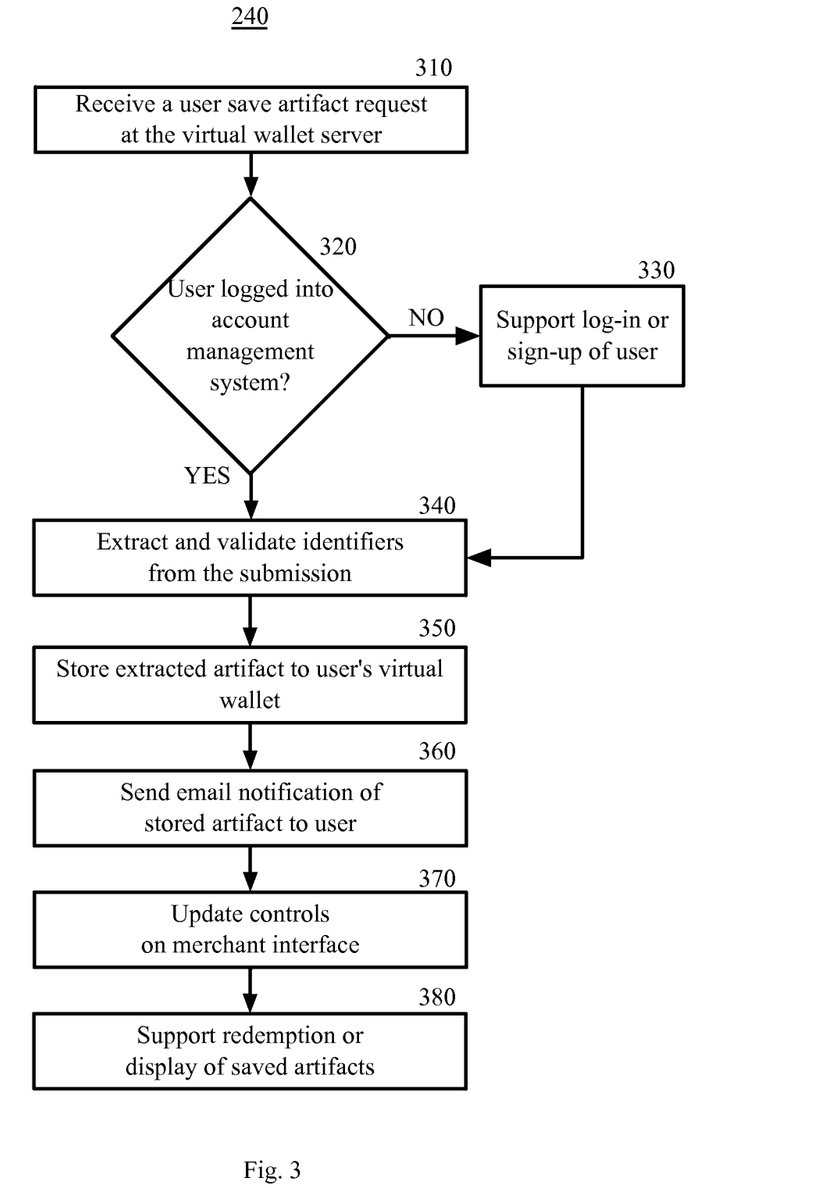
FIG. 3 is a block flow diagram depicting a method for supporting users saving artifacts to a virtual wallet, in accordance with certain example embodiments.

The Example methods illustrated in FIGS. 2-3 are described hereinafter with respect to the components of the example operating environment 100. The example method of FIGS. 2-3 may also be performed with other systems and in other environments.

FIG. 2 is a block flow diagram depicting a method 200 for supporting merchant virtual wallet activities, in accordance with certain example embodiments.

In block 210, the merchant operates the merchant computing device 110 to register with the virtual wallet server 130. This registration can coordinate information for identifying the merchant computing device 110 to the virtual wallet server 130 for the storing of artifacts to virtual wallets. The registration may include coupling an Internet domain, a uniform resource locator ("URL"), or some other resource identifier with the merchant computing device 110. The Internet domain or URL used for registering the merchant may then source web pages or other distribution channels that include buttons, or other interface controls to allow users 120 to save artifacts from the merchant computing device 110 to their virtual wallet. To verify the identity of the merchant computing device 110 during registration, the merchant may be logged into the account management server 140. Once verified, the merchant computing device 110 can receive a client identification token for use with its future artifact submission from the registered domain, URL, or other location identifier.

In block 220, the virtual wallet server 130 communicates an interface for embedding controls (for example, a user interface button, a link, etc.) to the merchant computing device 110. For example, an application programming interface ("API") may be provided to the merchant computing device 110 that allows the merchant computing device 110 to embed a control such as a button in association with a merchant artifact on a web interface hosted by the merchant computing device 110. The API may also include executable code instructions to generate a save artifact request in response to selection of the embedded control by a user. The embedded control can allow a user 120 accessing the web interface displaying the merchant artifact and embedded control via a mobile computing device 125 to select the control and save an instance of the corresponding artifact to their virtual wallet for offline redemption. The provided API may be a JavaScript API, or may be based on some other web-based script or language.

In block 230, the virtual wallet server 130 communicates a minimum renderable format ("MRF") for artifacts to the merchant computing device 110. The MRF may be useful to avoid versioning complications by defining a basic common denominator of artifact parameters to be supported. For example, these parameters may include offer identifier, version, title, description, thumbnail image URL, expiry date, and redemption strategy. Use of artifacts represented using the MRF can avoid the need to check versions and update code prior to storing, searching, or presenting artifacts. Inclusion of updated or richer parameters beyond the MRF definition may also be supported for use when possible. The MRF may support specifying certain categories of artifacts such as coupons, tickets, receipts, and so forth. Information of the categories can assist with searching. For example, when searching for a boarding pass, it may be known that it is meaningful to search by date.

In block 240, the system supports a user 120 saving artifacts to a virtual wallet. For example, interfaces with affiliated merchant tools may be provided to allow the merchant computing device 110 to display an artifact for selection by a user 120 for saving to a virtual wallet. Other merchant tools, programs, or systems affiliated with the virtual wallet server 130 or the account management server 140 may be interfaced to store, search, redeem, or present virtual wallet artifacts associated with the merchant computing device 110. Block 240 is described in further detail hereinafter with reference to FIG. 3.

In block 250, the virtual wallet server 130 can collect statistics for artifacts saved to virtual wallets. The statistics may include total numbers of artifacts saved, times they are saved, or so forth. For example, each time an artifact is saved, the mobile computing device 125 can communicate a notice to the virtual wallet server 130 to report the save action for the specified artifact. The virtual wallet server 130 saves the indication of the storage and aggregates indications of storage for the same artifact.

In block 260, the virtual wallet server 130 can collect statistics for artifacts redeemed from virtual wallets. The statistics may include total numbers of artifacts redeemed, times they are redeemed, locations of redemption, or so forth. For example, each time an artifact is redeemed, the mobile computing device can communicate a notice to the virtual wallet server 130 to report the redemption action for the specified artifact. The virtual wallet server 130 saves the indication of the redemption and aggregates indications of redemption for the same artifact.

In block 270, the virtual wallet server 130 can present collected statistics to the merchant computing device 110. For example, the merchant computing device 110 can view the number of artifacts saved and the number redeemed for any of their offers. In one example embodiment, the merchant can operate the merchant computing device 110 to communicate a request for information to the virtual wallet server 130. The virtual wallet server 130 receives the request, retrieves statistics for the subject of the request, and communicates the statistics to the merchant computing device 110 for display to the merchant. The subject of the request may be a specific artifact or all artifacts of the merchant and may include a request for number of times stored and/or number of times redeemed.

After block 270, the method 200 ends. Of course, the merchant computing device 110 can continue to support saving artifacts to virtual wallets by repeated application of the method 200.

FIG. 3 is a block flow diagram depicting a method 240 for supporting a user 120 saving artifacts to a virtual wallet, in accordance with certain example embodiments.

The method 240 begins at block 310, where the virtual wallet server 130 receives a save artifact request to save a merchant artifact to a user's 120 virtual wallet. The save artifact request is communicated to the virtual wallet server 130 after a user 120 selects the embedded control associated with a merchant artifact that the user 120 desires to save to their corresponding virtual wallet, by associating the artifact with a virtual wallet account record maintained by the virtual wallet server 130. The submission may be received from a registered merchant computing device 110 displaying the selected merchant artifact. In other example embodiments, the merchant computing device 120 may communicate artifact information to the mobile computing device 125 associated with the user 120, and the mobile computing device 125 then communicates the save artifact request to the virtual wallet server 130. According to some embodiments, the submission may be in the form of an XMLHttpRequest. The save artifact request comprises data for the merchant artifact as defined in the MRF as discussed above with reference to block 230 of FIG. 2. Accordingly, upon selection of the artifact for saving by the user 120, the computing device 110 or 125 reads the artifact data from the selected artifact, generates a request message comprising the artifact data, and communicates the request message to the virtual wallet server 130.

In block 320, the virtual wallet server 130 determines if the user 120 is logged into the account management server 140. For example, the virtual wallet server may request an account status from the account management server 140 indicating whether the user 120 is logged in from the account management server 140. If the user 120 is logged into the account management server 140, the method 240 may continue to block 340. Otherwise, the method 240 continues first to block 330 before continuing to block 340.

In block 330, the virtual wallet server 130 communicates a log in notification to the user 120. In certain example embodiments, the log in notification is displayed as a user interface object in an application, such as a browser application, executing on the mobile computing device 125. The user interface object may provide fields for entering login account information, or to register for a new virtual wallet account. After the virtual wallet server 130 receives the account login information, the method proceeds to block 340.

In block 340, the virtual wallet server 130 validates that the save artifact request is coming from an authorized domain registered for the corresponding client identifier. For example, the virtual wallet server 130 may cross-reference an index of registered merchant resource locators stored on or in communication with the virtual wallet server. In certain example embodiments, the virtual wallet server 130 may further verify that the request is for a valid virtual wallet based on the log-in credentials provided previously. In certain example embodiments, JavaScript implementations may base validations on XSRF token check operations.

In block 350, the virtual wallet server 130 stores the artifact in the virtual wallet account record associated with the user 120. Storing the artifact comprises storing the artifact data in the virtual wallet account record associated with the user 120 and maintained by the virtual wallet server 130. For example, the virtual wallet server 130 may generate a template from information extracted from the artifact defined by the MRF and store the template on the virtual wallet server 130 in association with the account record of the user 120.

In addition to storing new merchant artifacts, users 120 may elect to store an updated version of the same artifact made available by the merchant computing device 110. For example, a merchant may decide to change the discount associated with an existing offer or to update the time or location of an event associated with a ticket artifact. When the virtual wallet server 130, receives an updated artifact, the virtual wallet server 130 may duplicate the existing template and append a version number to the template's template identifier. The new template may replace the prior version, or the virtual wallet server 130 may maintain all versions of a template. Changes may, or may not, be reflected in older instances of a template previously saved into users' virtual wallets depending upon specifications of the merchant.

In block 360, the virtual wallet server 130 sends an email or other notification to the user 120. For example, the virtual wallet server 130 can send an email to the user 120 indicating that the artifact has been successfully saved and include instructions regarding how to redeem the artifact.

In block 370, the merchant computing device 110 updates the controls on the merchant interface. For example, the merchant computing device 110 may log that a user 120 has downloaded the artifact to the user's 120 virtual wallet. When an user 120 subsequently accesses the merchant user interface, the merchant computing device 110 may detect that the user 120 is logged into the account management server 140 and display an updated control to the user. For example, the updated control may have an alternative image associated with it, indicating that the user 120 has previously saved the artifact to the user's 120 virtual wallet, or that an updated version of the artifact is available.

In block 380, redemption or display of saved artifacts is supported. Once saved to a virtual wallet, an artifact can be redeemed using the mobile computing device 125. The mobile computing device 125 may allow artifact redemption in various formats such as NFC, visually displaying a textual code, visually displaying a bar code, rendering audio, video, images, infrared, radio frequency, or any other communications for interfacing with a system or human agent of the merchant or merchant computing device 110. The artifact may also be printed out by the user 120 and then used as a traditional transaction artifact.

After block 380, the method 240 ends. Of course, users 120 may continue saving artifacts to virtual wallets through repeated application of the method 240.

In certain example embodiments, various functions of the virtual wallet server 130 may be performed by and/or duplicated on the mobile computing device 125. For example, the mobile computing device 125 can maintain a virtual wallet account record of the user 120 for local storage and retrieval of artifacts. The mobile computing device 125 can maintain this record independently of the virtual wallet server 130, or the virtual wallet server can synchronize this record on the mobile computing device 125 such that the mobile computing device 125 and the virtual wallet server 130 include the artifact data.

Other Example Embodiments

Figure 4:
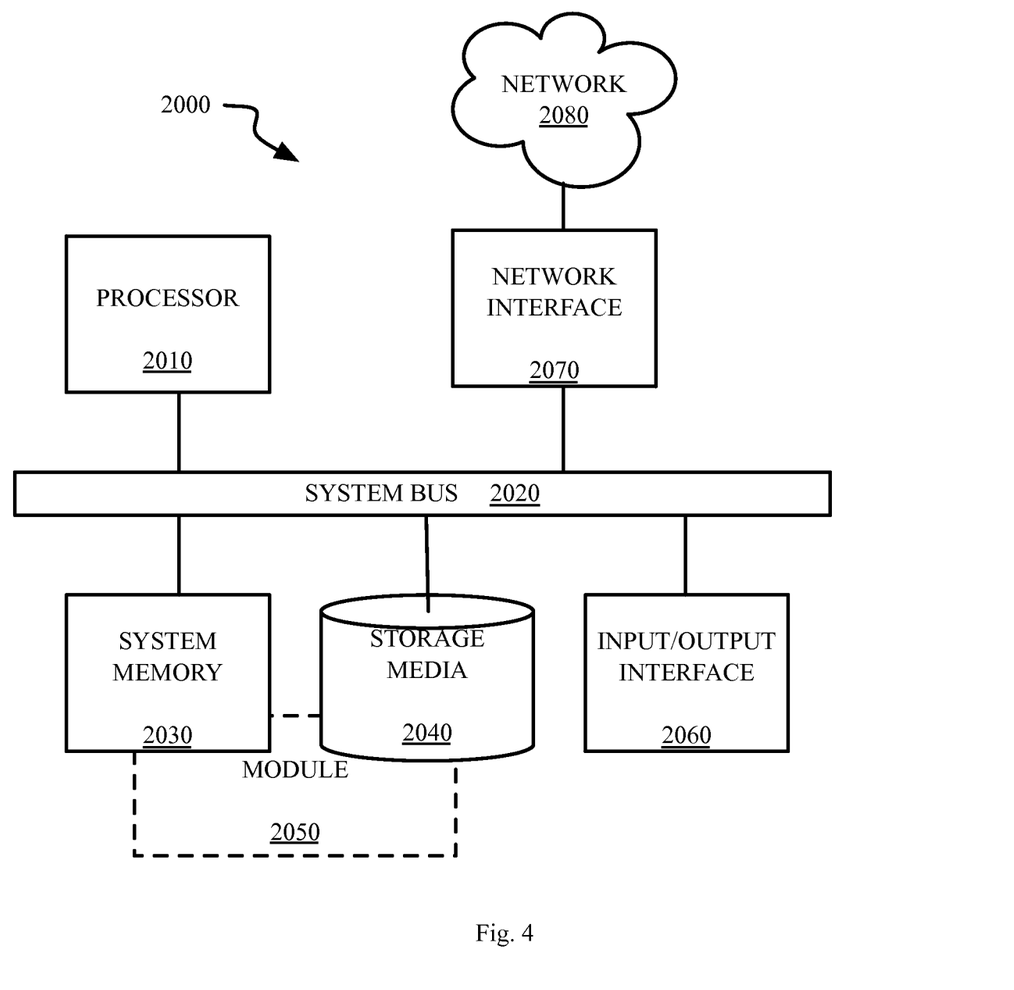
FIG. 4 is a block diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (for example, information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to store merchant artifacts to virtual wallets, comprising:
   providing, by a virtual wallet server, an embedded control and a minimum renderable format (MRF) file to a merchant computing device operated by a merchant, wherein the merchant computing device displays the embedded control in association with a merchant artifact on a merchant user interface, the embedded control comprising an application program interface that generates save artifact requests in response to selection of the embedded control, wherein the MRF defines a basic common denominator of required artifact parameters that must be included in save artifact requests;
   in response to selection of the embedded control in the merchant user interface displayed on a remote user device associated with a user, generating, by the application program interface of the embedded control element, a save artifact request, the save artifact request comprising artifact data extracted by the application program interface of the embedded control element from the displayed merchant artifact and as defined by the MRF, wherein the save artifact request is received from the remote user device associated with the user in response to the remote user device receiving the save artifact from the merchant computing device;
   communicating, by the embedded control element, the save artifact request to the virtual wallet server;
   in response to receiving the save artifact request, generating, by the virtual wallet server, a saved version of the merchant artifact in a virtual wallet account associated with a user of the remote user device, the saved version of the merchant artifact generated based on the artifact data in the save artifact request; and
   communicating the saved version of the merchant artifact from the mobile computing device of the user to a point of sale system, wherein communication of the saved version of the merchant artifact comprises displaying a barcode on a mobile computing device associated with the user to be scanned by the point of sale system associated with the merchant.

2. The computer-implemented method of claim 1, wherein the merchant artifact comprises one of a ticket, boarding pass, coupon, offer, and receipt.

3. A computer program product, comprising:
   a non-transitory computer-readable storage device having computer-executable program instructions embodied thereon that when executed by a computer cause the computer to store merchant artifacts to a virtual wallet, comprising:
   computer-executable program instructions to provide a control element and a minimal renderable format (MRF) file to a merchant computing device, wherein the merchant computing device displays the control element in association with a merchant artifact on a merchant user interface, the control element comprising an application program interface that generates save artifact requests in response to selection of the control element, and wherein the MRF defines a basic common denominator of required artifact parameters that must be included in save artifact requests;
   computer-executable program instructions to generate, by the application program interface, save artifact requests in response to selection of the control element;
   computer-executable program instructions to receive a save artifact request from a merchant computing device, the save artifact request generated by the control element in response to selection of the control element in the merchant user interface on a remote user device associated with a user, the save artifact request comprising artifact data extracted by the control element from the merchant artifact and as defined by the MRF, wherein the save artifact request is received from the remote user device associated with the user in response to the remote user device receiving the save artifact from the merchant computing device;
   computer-executable program instructions to generate a stored version of the merchant artifact in a virtual wallet account associated with a user of the remote user device in response to receiving the save artifact request, the saved version of the merchant artifact generated based on the artifact parameters in the save artifact request; and
   computer-executable program instruction to communicate the saved version of the merchant artifact to a point of sale system, wherein communicating the saved version of the merchant artifact to a point of sale system comprises displaying a scannable barcode on a mobile computing device associated with the user to be scanned by a point of sale system associated with the merchant.

4. The computer program product of claim 3, wherein the merchant artifact comprises one of a ticket, boarding pass, coupon, offer, and receipt.

5. A system to store merchant artifacts to virtual wallets, comprising:
- a storage device; and
- a processor communicatively coupled to the storage device, wherein the processor executes application code instructions that are stored in the storage device to cause the system to:
  - communicate a control element and a minimal renderable format (MRF) file to a merchant computing device, wherein the merchant computing device displays the control element in association with a merchant artifact on a merchant user interface, the control element comprising an application program interface that generates save artifact requests in response to selection of the control element, and wherein the MRF defines a basic common denominator of required artifact parameters that must be included in save artifact requests;
  - in response to selection of the control element, generate, by the application program interface, save artifact requests;
  - in response to selection of the control element displayed in the merchant user interface and on a remote user device associated with a user, receive a save artifact request, the save artifact request generated by the control element, the save artifact request comprising artifact data extracted by the control element as as defined by the MRF, wherein the save artifact request is received from the remote user device associated with the user in response to the remote user device receiving the save artifact from the merchant computing device;
  - in response to receiving the save artifact request, generate a stored version of the merchant artifact in a virtual wallet account associated with a user of the remote user device, the stored version of the merchant artifact based on the artifact parameters in the save artifact request; and
  - communicate the saved version of the merchant artifact to a point of sale system, wherein communicating the saved version of the merchant artifact comprises displaying a barcode on a mobile computing device associated with the user to be scanned by a point of sale system associated with the merchant.

6. The system of claim 5, wherein the merchant artifact comprises one of a ticket, boarding pass, coupon, offer, and receipt.

* * * * *